(No Model.)
C. L. TESKE.
CHUCK.
No. 594,919. Patented Dec. 7, 1897.
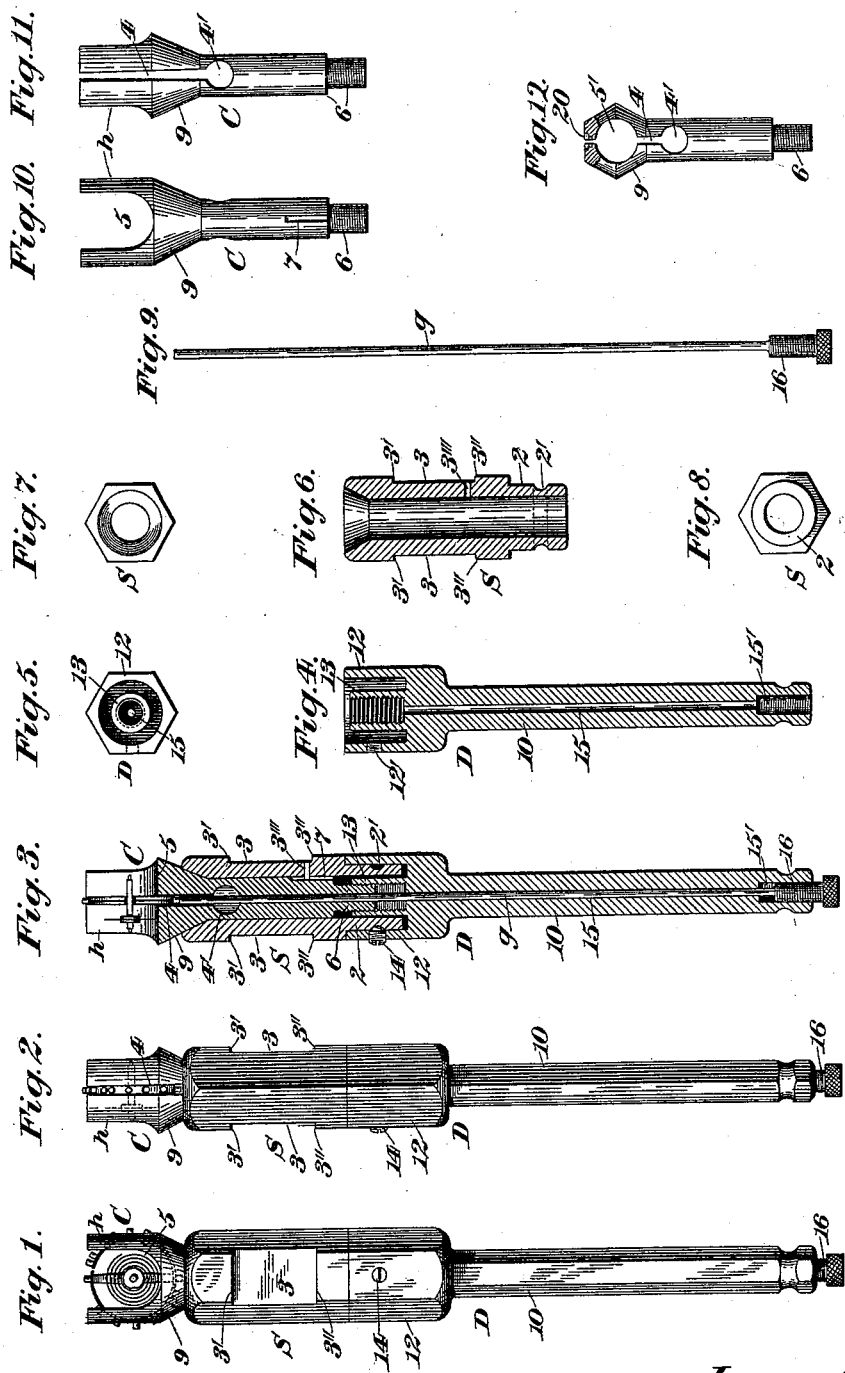
Witnesses:
J. L. Edwards Jr.
Fred. J. Dole
Inventor:
Charles L. Teske.
By his Attorney,
F. H. Richards.

UNITED STATES PATENT OFFICE.

CHARLES L. TESKE, OF HARTFORD, CONNECTICUT.

CHUCK.

SPECIFICATION forming part of Letters Patent No. 594,919, dated December 7, 1897.

Application filed February 5, 1897. Serial No. 622,071. (No model.)

*To all whom it may concern:*

Be it known that I, CHARLES L. TESKE, a citizen of the United States, residing in Hartford, in the county of Hartford and State of Connecticut, have invented certain new and useful Improvements in Chucks, of which the following is a specification.

This invention relates to chucks; and it has for its main object the provision of an improved chuck especially adapted for the use of jewelers and watchmakers, and in which the chuck-center will be adapted for holding and clamping in place watch-balances, pinions, jewels, &c., while these are being operated upon by the workman.

Another object of the invention is to provide an improved chuck in which the chuck-spindle and the drawing-in spindle for operating the chuck-center may be held against longitudinal movement relatively to each other to permit the proper adjustment of the chuck-center relatively to the work, and thus gage the movements of the chuck-center.

Still another object is to provide an improved chuck that may be clamped in a vise without marring the chuck and in such a manner as to form a firm support for the material or part held between the jaws of the chuck-center.

In the drawings accompanying and forming part of this specification, Figure 1 is a side elevation of a chuck constructed in accordance with my invention and supporting a balance-wheel, its staff, and a hair-spring between the jaws thereof. Fig. 2 is a similar view looking from the right in Fig. 1. Fig. 3 is a central longitudinal section of the chuck. Fig. 4 is a corresponding sectional view of the drawing-in spindle of the chuck. Fig. 5 is an end view of said drawing-in spindle, looking toward the inner end thereof. Fig. 6 is a longitudinal section of the chuck-spindle. Fig. 7 is an end view of the same, looking at the outer end thereof. Fig. 8 is an end view of the chuck-spindle, looking toward its inner end. Fig. 9 is a detail of a gage-rod for gaging the position of the work held by the chuck-jaws. Figs. 10 and 11 are detail side elevations of the chuck-center corresponding to the positions shown in Figs. 1 and 2, and Fig. 12 is a detail showing a modified form of the chuck-center.

Similar characters designate like parts in all the figures of the drawings.

My improved chuck embodies as one of its essential features a chuck-center the head of which has a longitudinal slot that divides the head and preferably intersects the longitudinal axis thereof and also has one or more large transverse openings in the side thereof and intersecting the first-mentioned slot, preferably between the ends of the latter. The longitudinal slot in the head of the chuck-center is intended to divide the latter and form, with such an opening as just described, spring-jaws adapted to engage and clamp between them the work to be operated upon, and especially, as before stated, such articles as watch-balances. One opening in the side thereof is intended to permit the work to be inspected readily and also to enable the workman to clamp in position a member having a projecting part or parts—as, for example, a watch-balance having the balance-wheel, the staff, and the hair-spring assembled.

The principal parts of my improved chuck are a chuck-spindle, a drawing-in spindle, and a chuck-center mounted within the chuck-spindle and adapted to be drawn in by the drawing-in spindle to clamp the work between the jaws of the chuck-center.

The chuck-spindle is designated in a general way by S and, as shown in Fig. 6, is of the usual tubular form, having a flared opening at its outer end. While it will be obvious that the external contour of this chuck-spindle may be varied at will, yet in the present instance this spindle is externally of hexagonal outline, except at the inner end thereof, where it is cylindrical in order to permit turning thereof relatively to the inner end of the drawing-in spindle. This cylindrical portion of the chuck-spindle is designated by 2 and has a peripheral groove 2' encircling the same, for a purpose which will be hereinafter specified.

In order to permit the chuck as a whole to be held in position in a vise for the workman to operate upon the part clamped between the jaws of the chuck-center which the chuck-spindle is intended to support, this spindle has two of its sides channeled at 3 3 to form parallel side walls, at the ends of which are parallel end walls 3' 3' and 3" 3", corresponding substantially to the positions of the parallel upper and lower edges of the vise-jaws, thus making it possible to hold the chuck-spindle and the parts carried thereby firmly in position without exerting any great pressure upon the chuck with the jaws of the vise.

The chuck-center is designated herein by C, and as to the shank thereof this is substantially similar to chuck-centers heretofore constructed; but the head of this chuck-center is essentially different from those now known in the art. The head of the chuck-center is designated in a general way by $h$ and is somewhat elongated. The longitudinal slot which bisects the head of this chuck-center and intersects the longitudinal axis thereof is indicated at 4 and preferably has its side walls formed so as to converge slightly toward the head of the chuck-center, (see Fig. 11,) this slot terminating at its inner end preferably in a large transverse opening 4', which passes entirely through the chuck-center and forms spring-jaws capable of yielding throughout the entire length thereof.

While the slot 4 is sufficient for the purpose of permitting a watch-balance or similar part to be clamped between the jaws of the chuck-center, yet for the purpose of properly inspecting the work and also for enabling the operator to clamp in position a part or combination of pieces of two or more widths the chuck-center also preferably has another large transverse opening in its side, which preferably extends from edge to edge of the chuck-center. In Fig. 10 this opening, which is indicated by 5, is in the nature of a wide and deep recess transverse to and intersecting the slot 4. In Fig. 12 a modification is shown in which this large opening, while it intersects the slot, does not traverse the head of the chuck-center in a direction transverse to the slot, but, on the contrary, passes through such head in the direction of the slot. It will be noted also that in the preferred form thereof this large opening in the head of the chuck-center intersects the mouth of the slot 4 and also both sides of the chuck-center, while in Fig. 12 the slot 5', although it intersects the two sides of the chuck-center, does not intersect the mouth of the slot 4.

The inner end of the chuck-center is screw-threaded in the usual manner, as shown at 6, and adjacent thereto a slot 7 is shown for the purpose of permitting the insertion of a key through a transverse opening, such as $3'''$, in the side of the chuck-spindle S to hold the chuck-center in engagement with the chuck-spindle in the usual manner. It will be noticed, moreover, that the inner portion of the head $h$ of the chuck-center is tapered in the usual manner, as shown at 9, to correspond to the taper of the flared outer end of the chuck-spindle.

The drawing-in spindle, by means of which the jaws of the chuck-center are clamped against the work and released therefrom, is illustrated at D, and in this instance has a reduced preferably hexagonal main portion 10, by which the chuck may be manipulated when used as a hand-tool and by which it may be held in the head of a lathe if used as a machine-tool. This spindle also has an inner end of large diameter, preferably shaped so as to coöperate properly with the chuck-spindle S and present a symmetrical appearance when combined therewith. This inner end of the drawing-in spindle has two tubular portions, the outer one of which is designated by 12 and has its bore of the same diameter as the external diameter of the cylindrical portion 2 of the chuck-spindle and the inner one of which, of small diameter, is designated by 13 and is interiorly screw-threaded for the purpose of engaging the screw-threads of the threaded portion 6 of the chuck-center. The space between the two tubular portions 12 and 13 of the inner end of the drawing-in spindle is of sufficient size to permit the tubular portion 2 of the chuck-spindle to work freely therein.

For the purpose of holding the chuck-spindle and the drawing-in spindle against longitudinal movement relatively to each other I prefer to provide a threaded opening 12' in one side of the tubular portion 12 of the drawing-in spindle and to insert in said opening a stop, which may be a round-pointed screw 14, the point of which when received in the peripheral groove 2' of the chuck-spindle will permit rotation of the drawing-in spindle on the tubular portion 2 of the chuck-spindle, but will hold the two parts against longitudinal movement. It will be obvious that by means of this organization of these two spindles relatively to each other the chuck-center may be operated not only inward to draw the jaws thereof together, but also outward to release these jaws from the work, the extent of movement of the chuck-center in the one direction or the other being regulated exactly and micrometrically by the turning of the spindle D.

The drawing-in spindle D is bored longitudinally through its entire length, as illustrated at 15, for the reception of a gage or its equivalent, such as the gage shown at $g$. This gage-rod may have a screw-threaded portion 16, adapted to engage corresponding screw-threads 15' at the outer end of the bore 15 in the spindle D, and this gage-rod also has a milled end for operating the same. The use of this gage-rod for the purpose of determining the position of the work held between the jaws of the chuck-center is well understood in the art and will not be described in detail herein.

In the modification of my improved chuck-center which is shown in Fig. 12 I have illustrated at the mouth of the slot 4 and at the end of the longitudinal axis of the chuck-center a recess 20, preferably in the form of a countersink of two diameters, for holding a jewel or other small part while the same is being operated upon.

The improved chuck herein described constitutes a very simple and efficient device for holding miscellaneous parts of irregular shapes between the jaws of the chuck-center, especially in a vise at a bench. Moreover, it permits the adjustment of the chuck-center toward and from the chuck-spindle, and hence the adjustment of the jaws of the chuck-center toward and from each other, by a positive action, the parts being so organized as to indicate each movement of the chuck-center in either direction and also the extent of such movement. It will be noticed that this result is attained by an organization of parts forming a tool complete in itself and is not dependent upon the construction of any particular form of lathe or other similar machine.

Having described my invention, I claim—

1. A chuck-center having a longitudinal bifurcating-slot intersecting the longitudinal axis of the chuck-center and forming holding-jaws, and also having an opening in its side disposed in a path transverse to that of the slot and intersecting said slot between the ends of the latter.

2. A chuck-center having a longitudinal bifurcating-slot intersecting the longitudinal axis of the chuck-center and forming holding-jaws, and also having a wide, deep recess transverse to said slot and intersecting the mouth of the slot and the side of the chuck-center.

3. A chuck-center having a longitudinal dividing-slot intersecting the longitudinal axis of the chuck-center and forming holding-jaws; a large opening in its side intersecting said slot; and a countersink in its head at the mouth of said slot and in the longitudinal axis of said chuck-center.

4. The combination, in a chuck, of a chuck-center; a chuck-spindle for supporting said chuck-center; a drawing-in spindle rotatable relatively to the chuck-spindle and connected with the chuck-center for actuating the same longitudinally of the chuck; and means for holding the chuck-spindle and the drawing-in spindle against longitudinal movement relatively to each other.

5. The combination, in a chuck, of a chuck-center; and a pair of spindles rotatable relatively to each other and one mounted on the other and one constituting a chuck-spindle and the other constituting a drawing-in spindle operatively connected with the chuck-center for actuating the same longitudinally of the chuck, and one of said spindles having a peripheral groove and the other having a stop working in said groove, for preventing longitudinal movement of the spindles relatively to each other.

CHARLES L. TESKE.

Witnesses:
FRED. J. DOLE,
F. N. CHASE.